(12) United States Patent
Radtke et al.

(10) Patent No.: US 9,186,743 B2
(45) Date of Patent: Nov. 17, 2015

(54) WELDING AND GOUGING SYSTEMS WITH MULTIPLE POWER SETTINGS

(75) Inventors: David Edwin Radtke, New London, WI (US); Joseph Carl Gitter, New London, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 819 days.

(21) Appl. No.: 12/884,011

(22) Filed: Sep. 16, 2010

(65) Prior Publication Data

US 2011/0114036 A1    May 19, 2011

Related U.S. Application Data

(60) Provisional application No. 61/261,567, filed on Nov. 16, 2009.

(51) Int. Cl.
*B23K 9/10* (2006.01)

(52) U.S. Cl.
CPC ..................... *B23K 9/1006* (2013.01)

(58) Field of Classification Search
CPC ........................................................ B23K 9/10
USPC .............................. 219/133, 134, 136, 137 PS
See application file for complete search history.

(56) References Cited

U.S. PATENT DOCUMENTS

| | | | |
|---|---|---|---|
| 5,968,385 A | 10/1999 | Beeson et al. | |
| 6,051,806 A * | 4/2000 | Shikata et al. | 219/130.33 |
| 6,310,321 B1 | 10/2001 | Beeson et al. | |
| 6,469,401 B2 | 10/2002 | Beeson et al. | |
| 6,603,097 B2 * | 8/2003 | Leisner et al. | 219/133 |
| 6,674,179 B2 | 1/2004 | Beeson et al. | |
| 6,707,001 B1 * | 3/2004 | Ulrich et al. | 219/130.21 |
| 6,812,584 B2 * | 11/2004 | Renner | 290/40 A |
| 6,876,096 B2 * | 4/2005 | Du Plessis et al. | 290/4 C |
| 8,115,328 B2 * | 2/2012 | Fosbinder et al. | 290/40 C |
| 2002/0190044 A1 | 12/2002 | Leisner et al. | |
| 2006/0157459 A1 | 7/2006 | Fosbinder | |
| 2008/0073330 A1 * | 3/2008 | Diedrick et al. | 219/133 |
| 2010/0193489 A1 | 8/2010 | Beeson et al. | |
| 2010/0194118 A1 | 8/2010 | Radtke et al. | |
| 2010/0194356 A1 * | 8/2010 | Fosbinder et al. | 322/25 |

FOREIGN PATENT DOCUMENTS

| | | | |
|---|---|---|---|
| CN | 2463097 | 12/2001 | |
| EP | 879665 A1 * | 11/1998 | B23K 9/10 |
| EP | 0879665 A1 | 11/1998 | |

OTHER PUBLICATIONS

International Search Report for application No. PCT/US2010/056737 mailed Feb. 25, 2011.

* cited by examiner

*Primary Examiner* — Dana Ross
*Assistant Examiner* — Ayub Maye
(74) *Attorney, Agent, or Firm* — Fletcher Yoder P.C.

(57) ABSTRACT

Embodiments of a welding power supply include a housing and a diesel engine disposed in the housing and adapted to output a first power output curve and a second power output curve substantially higher than the first power output curve. The welding power supply also includes a controller coupled to the diesel engine and adapted to control the diesel engine to operate along the first power output curve during a low power operation and to control the diesel engine to operate along the second power output curve during a high power operation.

20 Claims, 4 Drawing Sheets

WELDING AND GOUGING SYSTEMS WITH MULTIPLE POWER SETTINGS

CROSS REFERENCE TO RELATED APPLICATIONS

This application is a Non-Provisional patent application of U.S. Provisional Patent Application No. 61/261,567 entitled "Engine-Driven Welding and Gouging System with Multiple Power Settings", filed Nov. 16, 2009, which is herein incorporated by reference.

BACKGROUND

The invention relates generally to welding and gouging systems, and, more particularly, to a diesel engine system having different engine speed and power output settings for different operations.

A wide range of engine-driven generators and welding systems are currently available on the market. However, such systems may have high noise levels, inadequate power output, substantial fuel consumption, high emission levels, and so forth. Additionally, although engine-driven systems are typically run at set engine speeds regardless of the type of process selected, many applications require different outputs for different purposes. Certain improvements have been made to existing systems to overcome some of these drawbacks, specifically allowing for variable speed or specific speed settings. Systems of this type are disclosed, for example, in U.S. patent application Ser. No. 12/362,925, filed on Jan. 30, 2009 in the name of Beeson et al., U.S. patent application Ser. No. 12/363,033, filed on Jan. 30, 2009 in the name of Fosbinder et al., and U.S. patent application Ser. No. 12/363,131, filed on Jan. 30, 2009 in the name of Radtke et al., all of which are hereby incorporated into the present disclosure by reference. There exists a need, however, for further improvements to such systems that better address the aforementioned limitations of existing systems.

BRIEF DESCRIPTION

In an exemplary embodiment, a welding power supply includes a diesel engine having a first nominal setting with a first output rating operating at approximately 1800 RPM and a second setting with a second output rating operating above approximately 1890 RPM and control circuitry coupled to the diesel engine and configured to control the diesel engine to operate at the first nominal setting during welding operations and to operate at the second output setting during gouging operations.

In another embodiment, a welding power supply includes a diesel engine adapted to output a first power output curve and a second power output curve higher than the first power output curve and a controller coupled to the diesel engine and adapted to control the diesel engine to operate along the first power output curve during a low power operation and to control the diesel engine to operate along the second power output curve during a high power operation.

In another embodiment, a welding power supply, includes a diesel engine having a potential power output level, a low speed power output setting configured to utilize a first percentage of the potential power output level, and a high speed power output setting configured to utilize a remaining percentage of the potential power output level. The welding power supply also includes control circuitry coupled to the diesel engine and adapted to control the diesel engine to operate at the low speed power output setting during a low power operation and to operate at the high speed power output setting during a high power operation.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As described in detail below, embodiments of a welding power supply adapted to perform both low power operations (e.g., low power welding operations) and high power operations (e.g., gouging operations, welding operations with ¼" electrodes, etc.) are provided. In some embodiments, the welding power supply may be adjusted manually or automatically to select the appropriate operation. Furthermore, the welding power supply may include a diesel engine that is smaller than traditional diesel engines capable of providing a power output appropriate for gouging operations. For example, embodiments of the welding power supply disclosed herein may include a 24 HP diesel engine that normally operates at approximately 1800 RPM, although such values are not meant to limit the invention. The normal operating speed may be set for a first type of operation (e.g., low power), such as gas metal arc welding (GMAW), gas tungsten arc welding (GTAW), and so forth. However, a higher power output may be generated for a second type of operation, for example, high power operations such as gouging, welding with a ¼" diameter electrode, welding with a large diameter electrode and a high feed speed, and so forth. In such a way, embodiments of the welding power supplies disclosed herein may be capable of outputting power along a first output curve or a second output curve depending on the chosen setting, thus allowing the relatively small diesel engine to support multiple types of operations, for example, a low power operation (e.g., a welding operation) and a high power operation (e.g., a gouging operation).

Figure 1:
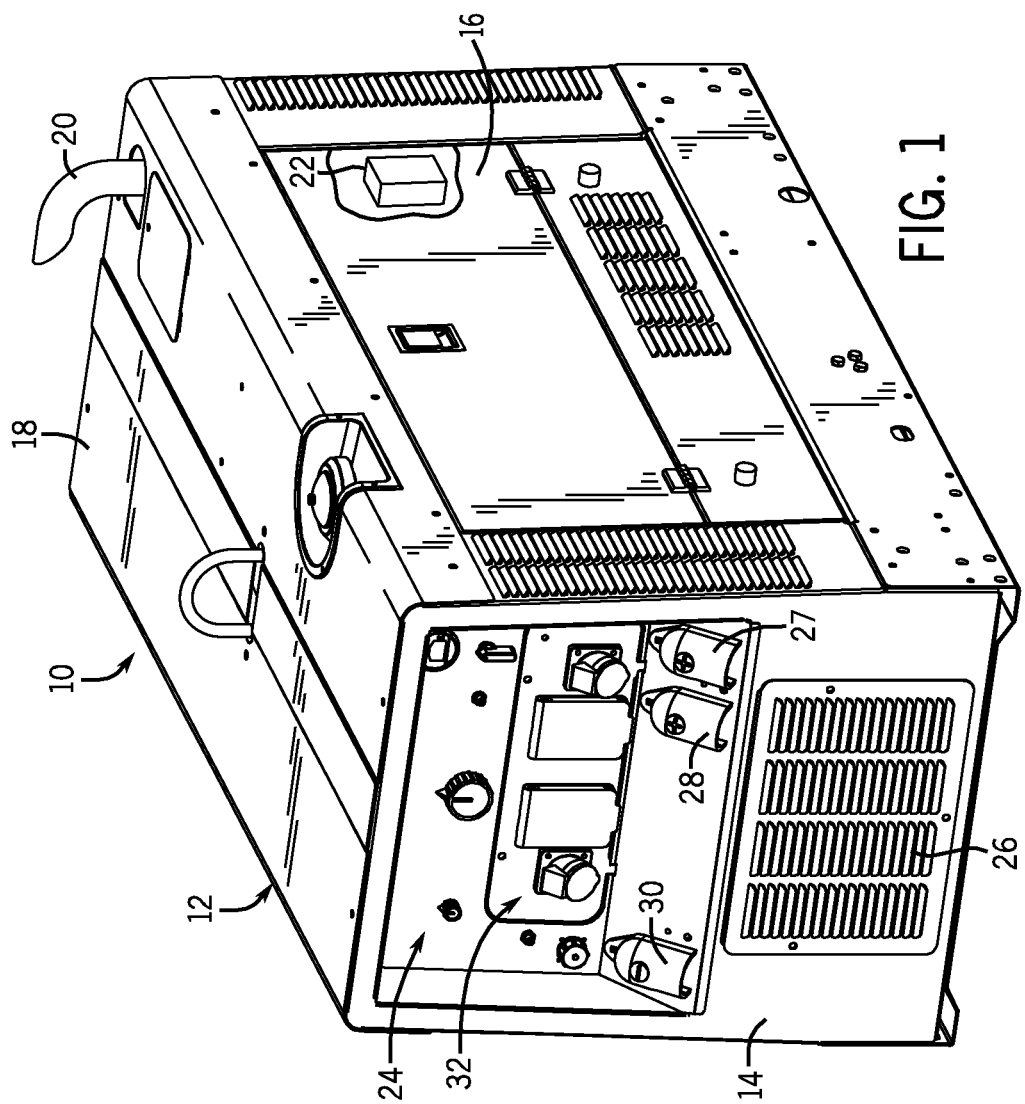
FIG. 1 is a perspective view of an exemplary welding power supply including multiple power settings in accordance with aspects of the present invention.

Turning now to the drawings, FIG. 1 illustrates an exemplary welding power supply 10 including a diesel engine in accordance with aspects of the present invention. In the illustrated embodiment, the welding power supply 10 includes a housing 12 adapted to enclose the diesel engine and having a front panel 14, a side panel 16, and a top panel 18. The top panel 18 includes exhaust pipe 20, and the side panel 16 includes a breakaway view illustrating a controller 22 located within the welding power supply 10. The front panel 14 includes an exemplary control panel 24 and air intake louvers 26.

In the illustrated embodiment, a single controller 22 is shown in the welding power supply. However in further embodiments, the welding power supply may include a welding controller and an engine controller. In such embodiments, the welding controller may be adapted to receive one or more welding parameters or settings from the welding operator via the control panel on the power source and to communicate such settings to the engine controller. The engine controller may be adapted to receive such feedback and to implement appropriate control of the diesel engine to generate the desired power output.

In the illustrated embodiment, the control panel 24 includes output stud covers 27, 28, and 30 configured to cover an air carbon arc gouging (CAC-A) positive gouging output terminal, a SMAW/GTAW//FCAW (flux-cored arc welding) positive weld output terminal, and a negative weld output terminal, respectively. The control panel 24 further includes a receptacle and circuit breaker panel 32, which will be described in more detail below. The control panel also includes a variety of knobs and switches disposed thereon that are configured to be utilized by an operator to set a variety of parameters during welding or gouging operations, as described in more detail below. Such controls located on the control panel 24 of the welding power supply 10 may be adapted to communicate data to the controller 22 located therein to control operation of the diesel engine such that an appropriate power output is generated for the operation being performed.

Figure 2:
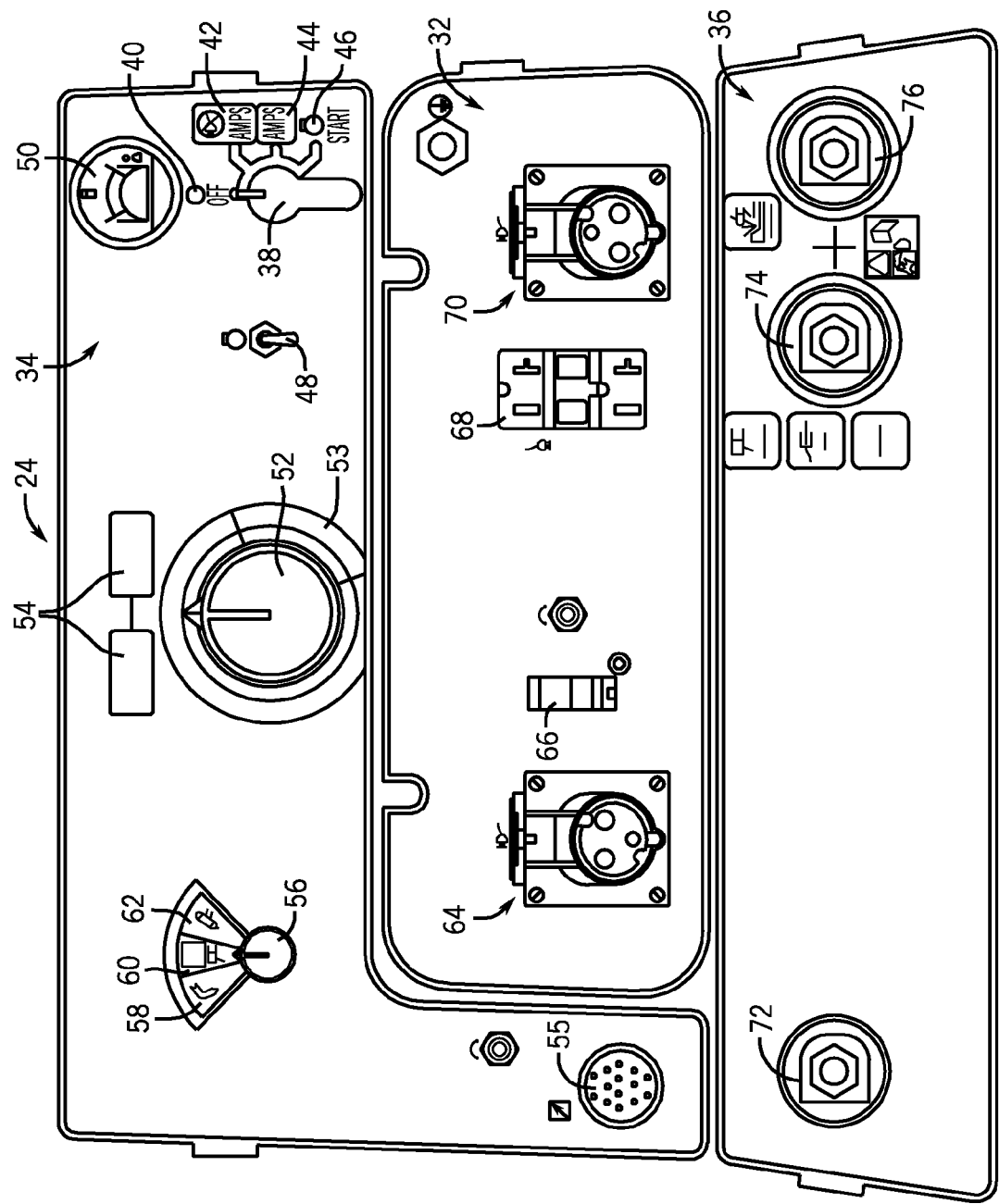
FIG. 2 illustrates an exemplary control panel that may be disposed on the welding power supply of FIG. 1 in accordance with aspects of the present invention.

FIG. 2 illustrates an exemplary control panel 24 that may be located on the power supply 10 of FIG. 1 to allow an operator to interface with the power supply to direct appropriate operation. That is, the control panel 24 may include a variety of knobs, switches, and terminals through which the user may communicate the type of operation to be performed, the desired power output, and so forth. To that end, in the illustrated embodiment, the control panel 24 includes a main control panel 34, the receptacle and circuit breaker panel 32, and an output terminal panel 36.

The main control panel 34 includes an engine control switch 38 that may be adjusted to start and stop the diesel engine and to select the appropriate power range for the given application. As such, the switch 38 may be positioned toward an off indicator 40, a high power indicator 42, a low power indicator 44, and a start indicator 46. For example, during normal weather conditions (e.g., above 32° F.), a user may move the switch 40 to the start indicator 46 to start the diesel engine. For further example, during cold weather conditions (e.g., below 32° F.), a user may, in the stated order, position the switch 40 to the 350-500 amps indicator 42, switch a preheat switch 48 to an upward position for a predetermined period of time (e.g., 20 seconds), and then position the switch 38 to the start indicator 46. Throughout operation, the user may utilize the switch 38 to select or change the desired output. To stop the engine after use, the user may position the switch 38 to the off indicator 40.

The main control panel 34 also includes a fuel gauge 50 configured to display the fuel level, engine hours, oil change interval and high temperature/low pressure/low fuel shutdown information. The main control panel 34 also includes a voltage/amperage control knob 52. When a SMAW or GTAW welding process is selected, the knob 52 may be used to adjust amperage. When a constant voltage (FCAW) process is selected, the knob 52 may be utilized to adjust voltage. Still further, during high power operations, the knob 52 may be adjusted within a high power mode adjustment section 53 to fine tune the power output curve followed by the diesel engine. That is, adjustment of knob 52 within the section 53 may allow the operator to tailor the voltage-amperage curve followed by the engine as appropriate for the given application. The control panel 34 further includes displays 54 that may cooperate with other components of the control panel to communicate one or more parameters to the user and a 14-pin receptacle 55 that provides a connection for remote controls and/or wire feeders if desired.

Still further, the main control panel 34 also includes a weld process selector switch 56. The weld process selector switch 56 may be positioned toward a FCAW position 58, a CAC-A/SMAW position 60, and a GTAW position 62 to direct the power supply to provide the appropriate output for the given operation. For example, if the user desires to perform a gouging operation, the user would position the switch 56 to the CAC-A/SMAW panel 60. In some embodiments, the weld process selector switch 56 and the engine control switch 38 may cooperate to provide the welding power supply the necessary instructions for operation. For instance, in the illustrated embodiment, if the user positions the engine control switch 38 toward the high power indicator 42 and the weld process selector switch to the CAC-A panel 60, the controller in the welding power supply would control the diesel engine to operate in a higher speed condition to support the CAC-A operation.

In the illustrated embodiment, the receptacle and circuit breaker panel 32 includes a 220V, 16 A AC receptacle 64, an earth leakage circuit breaker 66, a 110V, 20 A AC receptacle with ground fault 68, and a 110V, 16 A AC receptacle 70. The output terminal panel 36 includes a negative weld output terminal 72, a SMAW/GTAW/FCAW positive weld output terminal 74, and a CAC-A positive gouging output terminal 76. That is, embodiments of the presently disclosed welding power supply may include separate terminals 74 and 76 for welding and gouging operations, respectively. For example, during SMAW or GTAW welding with direct current electrode positive (DCEP) processes, the user may connect the electrode holder cable to the SMAW/GTAW positive receptacle 74 and connect the work cable to the negative terminal 72. For further example, for direct current electrode negative (DCEN) SMAW or GTAW processes, the user may connect the work cable to terminal 74 and the electrode holder cable to terminal 72. Still further, for CAC-A gouging operations, the user may connect the electrode holder cable to the positive terminal 76 and connect the work cable to the negative terminal 72. That is, for a gouging operation, the user may couple an appropriate rod for gouging operations to the positive terminal 76.

Figure 3:
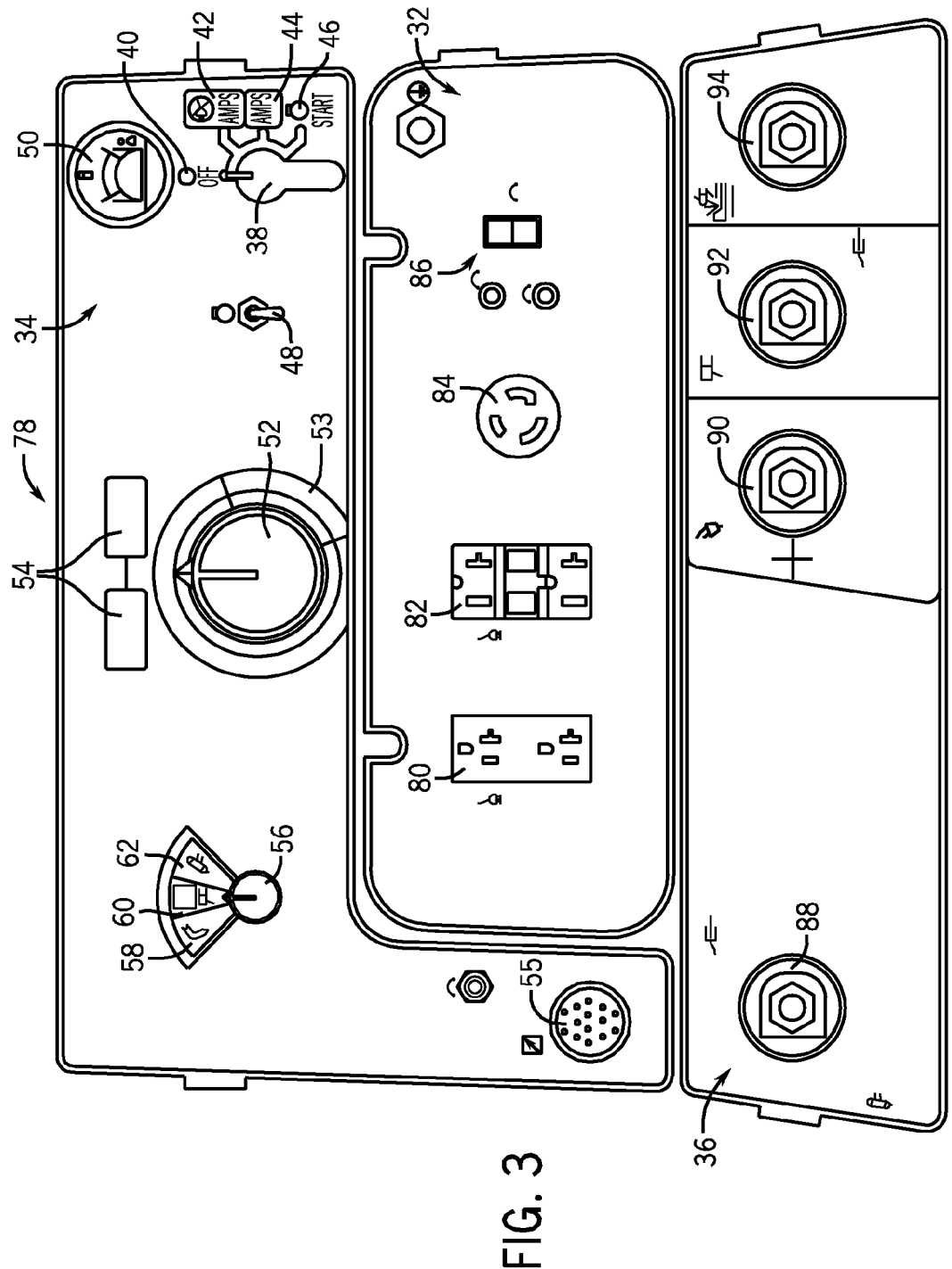
FIG. 3 illustrates an alternate exemplary control panel that may be disposed on the welding power supply of FIG. 1 in accordance with aspects of the present invention.

FIG. 3 illustrates an alternate control panel 78 that may be disposed on the front panel of the welding power supply of FIG. 1 in some embodiments. In this embodiment, as before, the main control panel 34 includes engine control switch 38, preheat switch 48, adjustment knob 52, weld process select switch 56, and the 14-pin receptacle 55, which may be utilized to set the process and control the output of the power supply. Further, in this embodiment, the receptacle and circuit breaker panel 32 includes a 120V, 20 A AC receptacle 80, a 120V, 20 A AC receptacle with ground fault 82, a 240V, 20 A AC receptacle 84, and circuit breakers 86.

The output terminal panel 36 includes a negative weld output terminal 88, a GMAW/FCAW positive weld output terminal 90, a SMAW/GTAW positive weld output terminal 92, and a CAC-A positive gouging output terminal 94. As before, the user may connect the work cable and the electrode holder cable to the appropriate terminals based on the selected process. For example, if the desired operation is a gouging operation, the user may connect the electrode holder cable to the CAC-A terminal 94 and the work cable to the negative terminal 88. Additionally, the user would position the switch 56 to the CAC-A position 60 and the switch 38 to the 350-500 amps indicator 42. Such a setup would indicate to the controller 22 to control the diesel engine to output maximum power.

Figure 4:
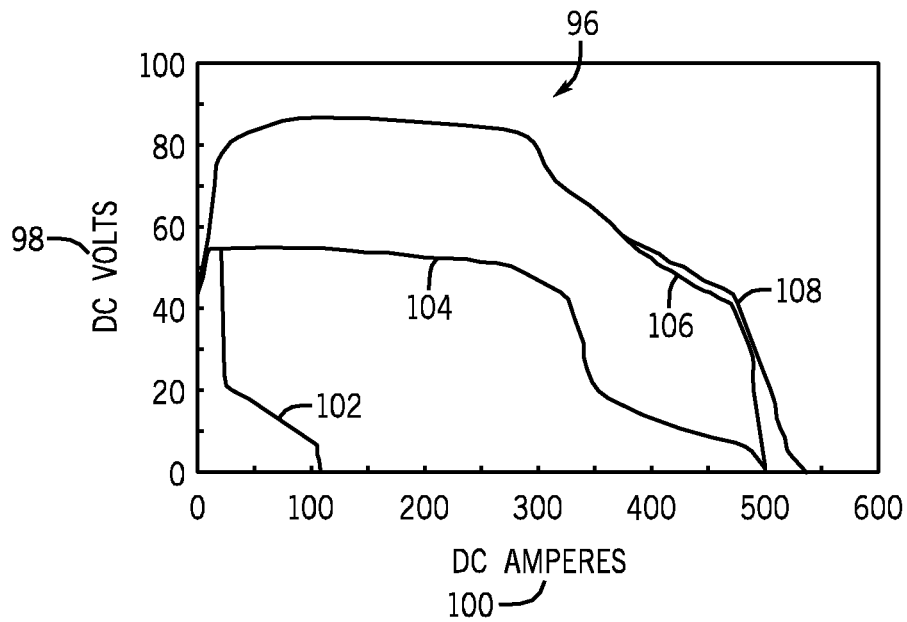
FIG. 4 is a graph illustrating exemplary output voltage versus amperage plots that may be generated during operation of the welding power supply of FIG. 1.

FIG. 4 is a graph 96 illustrating exemplary volt-ampere curves showing the minimum and maximum voltage and amperage output capabilities of an embodiment of the welding power supply disclosed herein. The graph 96 include a DC volts axis 98, a DC amperes axis 100, a low power output mode plot 102, a 350 A output plot 104, a welding power plot 106, and a maximum CAC-A power mode plot 108. Such plots illustrate exemplary output curves of the diesel engine that may be followed depending on the selections made by the user on the control panel. For example, the illustrated plots show engine operation in a SMAW mode of operation. That is, during SMAW welding, the diesel engine output follows the minimum economy mode plot 102 or the 350 A economy mode plot 104 depending on the necessary output for the given operation. For higher power weld operations, however, the diesel engine may follow the maximum power mode plot 106. Still further, when the operator is performing a gouging operation, the diesel engine follows the maximum CAC-A power mode plot 108. As such, the output of the diesel engine may be maximized during CAC-A operations but may remain at an economy level during welding operations. Accordingly, embodiments of the presently disclosed welding power supply are capable of providing a high output with a relatively small diesel engine.

Figure 5:
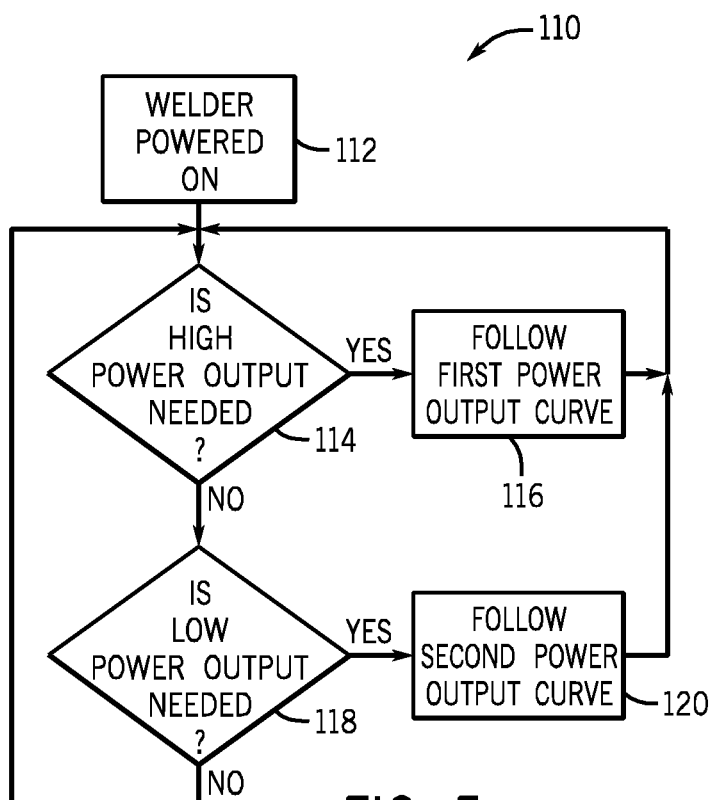
FIG. 5 is a flow chart illustrating exemplary control logic that may be employed to operate the welding power supply of FIG. 1 in accordance with aspects of the present invention.

FIG. 5 illustrates exemplary control logic 110 that may be utilized by the controller 22 of the welding power supply to determine engine setup. The logic begins with the welder being powered ON (block 112). The logic 110 includes checking if a high power output is needed (block 114). For example, the controller may check the control panel inputs to verify whether or not a gouging operation has been selected. If the high power output is needed, the controller controls the engine to follow the first power output curve (block 116). High power operations may include but are not limited to gouging, welding with a ¼" wire diameter, welding with a large wire diameter and a high feed speed, and so forth.

If the high power output is not needed, the controller checks if a low power output is needed (block 118). For example, the controller may check if a welding operation (e.g., a SMAW welding operation) has been selected by the user via the control panel. If a low power output is needed, the controller may control the engine to follow the second power output curve (block 120). If the low power output is not needed, the controller may continue to check for a needed power output level. As such, embodiments of the presently disclosed weld power supplies may be adapted to be controlled to produce a low power output or a high power output as needed for the given operation.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding power supply, comprising:
   a diesel engine having a first nominal setting operating at substantially 1800 RPM and a second nominal setting operating above substantially 1890 RPM;
   control circuitry coupled to the diesel engine and configured to control the diesel engine to operate along a first power output curve at the first nominal setting during welding operations and to operate along a second power output curve higher than the first power output curve at the second nominal setting during gouging operations; and
   a switch having a first selection for controlling the diesel engine to operate along the first power output curve at the first nominal setting at substantially 1800 RPM during the welding operations, and a second selection for controlling the diesel engine to operate along the second power output curve at the second nominal setting above substantially 1890 RPM during the gouging operations, wherein the switch is configured to be adjusted to the first selection and to the second selection by an operator, and wherein by selecting the first selection the operator selects the first nominal setting for the welding operations, and by selecting the second selection the operator selects the second nominal setting for the gouging operations.

2. The welding power supply of claim 1, comprising a housing having a control panel with an electrical outlet configured to provide power when the diesel engine is operating at a non-synchronous speed during the gouging operations.

3. The welding power supply of claim 1, comprising a housing having a control panel with the switch.

4. The welding power supply of claim 1, wherein the first and second power output curves comprise voltage-to-amperage curves.

5. The welding power supply of claim 2, wherein an output of the electrical outlet is voltage regulated.

6. The welding power supply of claim 2, wherein the electrical outlet is configured to provide power for an auxiliary device.

7. The welding power supply of claim 2, wherein the electrical outlet is configured to provide power for SMAW welding or plasma cutting.

8. A welding power supply comprising:
   a diesel engine configured to output a first power output curve and a second power output curve higher than the first power output curve, wherein the first and second power output curves comprise voltage-to-amperage curves;
   a controller coupled to the diesel engine and configured to control the diesel engine to operate along the first power output curve during a low power operation and to control the diesel engine to operate along the second power output curve during a high power operation, wherein the low power operation comprises a welding operation and the high power operation comprises a gouging operation; and
   a switch having a first selection for controlling the diesel engine to operate along the first power output curve, and a second selection for controlling the diesel engine to operate along the second power output curve, wherein the switch is configured to be adjusted to the first selection and to the second selection by an operator, and wherein by selecting the first selection the operator selects the first power output curve for the low power operation, and by selecting the second selection the operator selects the second power output curve for the high power operation.

9. The welding power supply of claim 8, further comprising a control panel comprising a receptacle configured to utilize non-synchronous primary power to produce output power when the diesel engine is operating along the second power output curve.

10. The welding power supply of claim 8, further comprising a control panel comprising a power outlet configured to couple to an alternate weld device during the high power operation.

11. The welding power supply of claim 8, wherein the diesel engine is configured to operate at an engine speed equal to substantially 1800 RPM during operation along the first power output curve.

12. The welding power supply of claim 8, wherein the diesel engine is configured to operate at an engine speed equal to substantially 3000 RPM during operation along the second power output curve.

13. The welding power supply of claim 9, wherein the receptacle is protected by a current leakage device.

14. The welding power supply of claim 9, wherein the output power is voltage regulated.

15. The welding power supply of claim 9, wherein the receptacle is configured to provide power for at least one of a light and a grinder.

16. A welding power supply, comprising:
  a diesel engine having a potential power output level, a low speed power output setting configured to utilize a first percentage of the potential power output level, and a high speed power output setting configured to utilize a remaining percentage of the potential power output level;
  control circuitry coupled to the diesel engine and configured to control the diesel engine to operate at the low speed power output setting during a low power operation and to operate at the high speed power output setting during a high power operation, wherein the low power operation comprises a welding operation and the high power operation comprises a gouging operation; and
  a switch having a first selection for controlling the diesel engine to operate at the low speed power output setting, and a second selection for controlling the diesel engine to operate at the high speed power output setting, wherein the switch is configured to be adjusted to the first selection and to the second selection by an operator, and wherein by selecting the first selection the operator selects the low speed power output setting for the low power operation, and by selecting the second selection the operator selects the high speed power output setting for the high power operation.

17. The welding power supply of claim 16, wherein the low power operation comprises a SMAW welding operation.

18. The welding power supply of claim 16, further comprising a power receptacle configured to provide power for one or more auxiliary tools capable of operating off a non-synchronous speed of the diesel engine.

19. The welding power supply of claim 16, wherein the high speed power output setting corresponds to an engine speed of substantially 3000 RPM.

20. The welding power supply of claim 16, wherein the high power operation comprises a welding operation utilizing a large diameter wire and a high feed speed.

* * * * *